United States Patent Office 3,293,039
Patented Dec. 20, 1966

---

3,293,039
PECKING STONE FOR BIRDS
Raymond St. Hilaire, Paterson, N.J., assignor of fifty percent to Vasilije Starcev, Paterson, N.J.
No Drawing. Filed May 17, 1963, Ser. No. 281,336
1 Claim. (Cl. 99—4)

This invention relates to a bird grit cake or pecking stone and composition.

An object of the invention is to provide an improved grit cake and composition therefor for use by parakeets and like domesticated birds for the care and abrading of the bill and for supplying the necessary gravel, roughage and certain nutrients which captive birds frequently lack in their diet.

Another object of the invention is to provide a bird cake or stone which may be molded into any desired shape and formed of readily available materials and which is durable and long-lasting and economical to manufacture.

Another object is to provide an improved pecking cake or stone for birds which will attract the birds and thereby eliminate the tendency for pecking at paint, window curtains and other objects in the home, the stone or cake containing ingredients highly beneficial to the bird and which may be dislodged for consumption while the bird simultaneously trims and blunts its bill.

Other objects and advantages of the invention will be apparent during the course of the following detailed description.

In accordance with the invention under a preferred embodiment thereof, the composition from which the cake or stone is molded to provide a relatively hard homogeneous mass of the preferred shape and size is the following.

| | |
|---|---|
| Crushed divided oyster shell | 2½ ozs. |
| Fine gravel (⅛th" maximum size) | 2½ ozs. |
| Finely divided charcoal | 10 grams. |
| Powdered pumice | 1 oz. |
| Glastone | 2 ozs. |
| Honey (liquid) | 1½ ozs. |
| Cod liver oil (liquid) | 6 grams. |
| Table salt (NACL) | 4 grams. |
| Water | 2 ozs. |

Glastone is a well-known casting or molding composition employed in the dental art to produce a dental stone cast having improved compressive strength. It is employed in the present invention to bind the other ingredients together at the time of molding of the product. Glastone is fully disclosed in United States Patent 3,083,110, issued March 26, 1963, and is a commercial product. As set forth in said patent, Glastone consists essentially of about 100 parts of alpha calcium sulfate hemihydrate, from about 0.01 to about 3 parts of urea, thiourea or both combined, and from about 0.001 to about 4 parts of hydrazine sulfate, strychnine sulfate, or both combined. Glastone is a trademark.

The above ingredients in no special order are placed together in a receptacle and thoroughly mixed into a putty-like mass and are then placed in a conventional mold of desired shape and allowed to harden at room temperature (70° F.) for approximately 2½ hours. At the end of this time, a cake or stone is produced which is very hard and homogeneous and gray in color with individual particles of shell and gravel exposed at the surfaces of the stone and throughout the same. The stone may be molded into any preferred shape and may have a socket opening molded therein for interfitting relationship with a supporting stem. The size or mass of the stone may be increased or decreased by altering the amounts of the ingredients but preserving their proportions by weight as enumerated above.

When the stone or cake is placed freely on a support or mounted upon a pedestal above a suitable platform, the bird or birds may peck the same over its entire surface to obtain the grit and nutrients and care for the bill or beak in this process.

By supplementing a conventional seed diet with the pecking stone, parakeets and like birds are maintained in excellent health and will devote their energies to pecking the stone instead of paint or other ornamental objects in the home.

It is to be understood that the form of the invention herein described is to be taken as a preferred example of the same and that various changes in the proportions of ingredients may be resorted to, without departing from the scope of the subjoined claim.

Having thus described my invention, I claim:

A pecking stone for birds comprising approximately 2½ ozs. finely divided oyster shell, 2½ ozs. gravel, 10 grams charcoal, 1 oz. pumice, 2 ozs. Glastone, 1½ ozs. honey, 6 grams cod liver oil, 4 grams salt and 2 ozs. water.

References Cited by the Examiner

UNITED STATES PATENTS

| | | | |
|---|---|---|---|
| 672,672 | 7/1900 | Green et al. | 99—2 |
| 753,694 | 6/1901 | Garchey | 65—33 |
| 849,011 | 4/1907 | Murray | 99—4 |
| 866,641 | 9/1907 | Fucho | 99—4 |
| 1,056,603 | 3/1913 | Stiefel | 99—4 |
| 1,171,676 | 2/1916 | Sutcliffe | 65—19 |
| 1,178,279 | 4/1916 | Uffel | 99—4 |
| 1,399,206 | 12/1921 | Gallagher | 99—4 |
| 2,079,340 | 5/1937 | Smith | 99—2 |
| 2,331,807 | 10/1943 | Shea | 99—4 |
| 2,895,829 | 7/1959 | Feo et al. | 99—2 |
| 3,083,110 | 3/1963 | Preston | 106—38.35 |

A. LOUIS MONACELL, *Primary Examiner.*

D. DONOVAN, *Assistant Examiner.*